Patented Sept. 13, 1938

2,129,677

UNITED STATES PATENT OFFICE 2,129,677

MANUFACTURE OF NEW AZINE DYESTUFFS

Francis Henry Swinden Curd, Blackley, Manchester, England, assignor to Imperial Chemical Industries Limited, a corporation of Great Britain No Drawing. Application December 4, 1935, Serial No. 52,931. In Great Britain December 11, 1934

1 Claim. (Cl. 260—29)

This invention relates to the manufacture of new water-soluble azine dyestuffs.

In British specification 18,729 of 1908, there is described the preparation of azine dyestuffs, including dinaphthosafranine dyestuffs, by the simultaneous oxidation of 1:2-di(phenylamino)-naphthalene-8-sulphonic acid and a para diamine containing at least one free amino group. Among the para-diamines indicated as suitable for that purpose is 4-amino-1-phenylaminonaphthalene-8-sulphonic acid.

I now find that by using in similar reactions a 4-amino-1-arylaminonaphthalene-8-sulphonic acid having a para-alkoxy substituent in the aryl residue, I am able to obtain dinaphthosafranines having new and valuable properties.

According to the present invention I manufacture new dinaphthosafranine dyestuffs by the simultaneous oxidation of a 1:3-di(arylamino)-naphthalene-8-sulphonic acid and a 4-amino-1-(4'-alkoxyarylamino)-naphthalene-8-sulphonic acid.

In the above defined reagents I mean by "aryl" a nonnuclear residue of the benzene series, as will be made clear hereinafter. "Alkoxy" in the above definition signifies alkoxy groups, having up to and including 8 carbon atoms, such as for example, methoxy, isopropyloxy, n-butyloxy, isoamyloxy and the like. Among the alkoxyarylamino derivatives suitable for use according to the invention are:—

4-amino-1-(4'-methoxyphenylamino)naphthalene-8-sulphonic acid,
4-amino-1-(4'-ethoxytolylamino)naphthalene-8-sulphonic acid,
4-amino-1-(2':4'-dimethoxyphenylamino)naphthalene-8-sulphonic acid.

Suitable diarylaminonaphthalene derivatives are, for example:—

1:3-di(phenylamino)naphthalene-8-sulphonic acid,
1:3-di(tolylamino)naphthalene-8-sulphonic acid,
1:3-di(xylylamino)naphthalene-8-sulphonic acid,
1:3-di(methoxyphenylamino)naphthalene-8-sulphonic acid, or the corresponding ethoxy derivative.

Methods which may be used for the simultaneous oxidation of the above defined reagents are any of those referred to in British specification 11,892 of 1893, 18,729 of 1908 and 414,138. The preferred method is, however, oxidation by a current of air in presence of ammoniacal copper oxide.

The new dyestuffs of the present invention are characterized by their greatly superior greenness of shade compared with the known dinaphthosafranine dyestuffs of British specification 18,729 of 1908. The new dyestuffs have, moreover, excellent light fastness. The new dyestuffs are soluble in water and dye wool from an acid bath in green-blue to green shades.

The invention is illustrated but not limited by the following example, in which the parts are by weight.

Example 78 parts of 1:3-di(phenylamino)naphthalene-8-sulphonic acid and 72 parts of 4-amino-1-(4'-ethoxyphenylamino)naphthalene-8-sulphonic acid are dissolved in 1,500 parts of 50% alcohol and 42 parts of calcined and sodium carbonate. To this solution is added a solution of ammoniacal copper oxide prepared from 8 parts of crystalline copper sulphate. Air is then passed through the solution at 40-45° C. during 12 hours or until the formation of the dyestuff is complete. The dyestuff is then salted out with sodium chloride, filtered off, washed with water and dried. The new dyestuff is a dark brown powder which gives bluish green solutions in water and gives green solutions in concentrated sulphuric acid.

The new dyestuff dyes wool from an acid bath in beautiful green shades of excellent fastness to light.

The 4-amino-1-(4'-ethoxyphenylamino)naphthalene-8-sulphonic acid used in the above example is prepared as follows:—

22.8 parts of 1-(4'-ethoxyphenylamino)naphthalene-8-sulphonic acid, prepared by phenylation of Peri acid by treatment with p-phenetidine and p-phenetidine hydrochloride under the conditions described by Cain (Manufacture of Intermediate Products for Dyes, 2nd edition, page 194, are dissolved in 300 parts of water and 3.6 parts of calcined sodium carbonate; 23 parts of sodium acetate crystals are then added and the solution cooled below 5° C. To the cooled solution is added gradually a solution of diazobenzene obtained by diazotizing 6.2 parts of aniline in the usual way and then neutralizing the diazotized solution to Congo red paper by adding sodium acetate crystals. When coupling is complete the suspension of the azo compound is made alkaline to brilliant yellow paper by adding aqueous caustic soda and the sodium salt of the azo compound is isolated by salting out.

12.5 parts of the azo compound so obtained are dissolved in 200 parts of water and heated to 90° C. To this solution, 17.5 parts of sodium hydrosulphite are added in small portions, meanwhile keeping the reduction just alkaline to brilliant yellow paper by the addition of sodium carbonate. The reduction mixture, which is almost colourless at the completion of the reduction, is then steam-distilled to remove aniline and filtered. The filtered reduction mixture is then made acid to Congo red paper by the addition of hydrochloric acid and the precipitated 4-amino-1-(4'-ethoxyphenylaminonaphthalene-8-sulphonic acid is filtered off and dried. 5.8 parts of dry product are obtained.

By using p-anisidine in place of p-phenetidine in the above intermediate preparation 4-amino-1-(4'-methoxyphenylamino) naphthalene-8-sulphonic acid is obtained. This compound on simultaneous oxidation along with 1:3-di(phenylamino) naphthalene-8-sulfonic acid gives the methoxy dyestuff corresponding to that described in the above example. The new methoxy dyestuff has similar properties to those described above and dyes wool in green shades from an acid bath.

The dyestuffs of the present invention have in the acid form the general formula

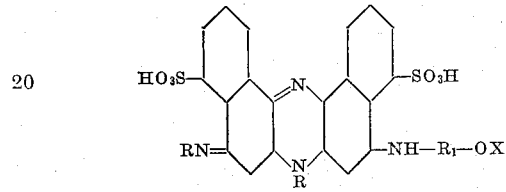

wherein R, R and $R_1$ represent mononuclear aryl radicals, X is an alkyl group containing not more than 8 carbon atoms, the group OX being located in the aryl radical $R_1$ in position para to the NH group.

I claim:
The dyestuff corresponding to the formula

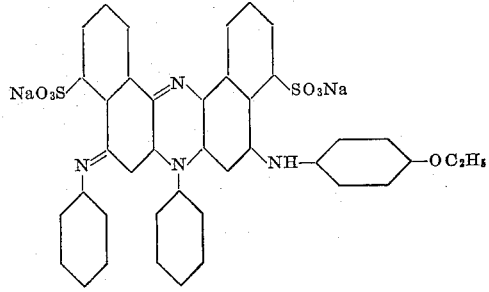

said dyestuff being when dry a dark brown powder, soluble in water with a bluish green colour and in concentrated sulphuric acid with a green colour, and dyeing wool from an acid bath in green shades.

FRANCIS HENRY SWINDEN CURD.

CERTIFICATE OF CORRECTION.

Patent No. 2,129,677. September 13, 1938.

FRANCIS HENRY SWINDEN CURD.

It is hereby certified that error appears in the printed specification of the above numbered patent requiring correction as follows: Page 1, first column, line 24, for "nonnuclear" read mononuclear; and that the said Letters Patent should be read with this correction therein that the same may conform to the record of the case in the Patent Office.

Signed and sealed this 15th day of November, A. D. 1938.

Henry Van Arsdale (Seal) Acting Commissioner of Patents.